United States Patent Office 3,219,689
Patented Nov. 23, 1965

3,219,689
PROCESS FOR THE OXIDATION OF CYCLO-
ALKANE CARBOXYLIC ACID
Johan A. Bigot, Beek, and Pieter L. Kerkhoffs, Geleen,
Netherlands, assignors to Stamicarbon N.V., Heerlen,
Netherlands
No Drawing. Filed July 24, 1961, Ser. No. 125,979
Claims priority, application Netherlands, Aug. 4, 1960,
254,566
4 Claims. (Cl. 260—514)

The present invention relates to the manufacture of organic compounds by the high temperature reaction of cyclic alkane carboxylic acids with oxygen. The products obtained include cyclic ketones, cyclic olefins and unsaturated cyclic carboxylic acids.

The known method for manufacture of cyclohexanone and other cyclic ketones is the oxidation and decarboxylation of benzoic acid to phenol and subsequent hydrogenation of this phenol to cyclohexanol, followed by dehydrogenation to cyclohexanone. Cyclohexene can be made from cyclohexanol by dehydration with sulfuric acid, or the like and the manufacture of unsaturated cyclic carboxylic acids is also difficult. These procedures are complex and involve a plurality of steps with consequent losses in efficiency and expense for equipment.

In accordance with the present invention, a method is provided for the manufacture of these compounds which requires only a single step, starting with a cyclic aliphatic carboxylic acid. The reaction is carried out in the liquid phase by reacting the cyclic aliphatic carboxylic acid with oxygen at a temperature above 150° C. and in the presence of a metallic compound which is at least partly dissolved in the reaction liquid. Preferably, the reaction is carried out in the presence of water and/or water vapor, since water has a promoting action and tends to suppress the formation of certain by-products such as esters.

The process can be carried out in a simple way by leading oxygen or an oxygen-containing gas, such as air, through a melt of the cyclic aliphatic carboxylic acid in which the metallic compound is at least partially dissolved and, when water vapor is used, this too may be passed through the melt. The temperature is kept above 150° C., and at a lower temperature there is practically no reaction. At temperatures above the normal boiling point of the acid, the reaction is carried out at elevated pressure sufficient to liquify the acid. Generally, such higher temperatures are not preferred since the formation of undesired products increases.

In order to promote the reaction with oxygen, the process may be carried out under elevated pressure such as 20, 40, 100 or 150 atmospheres, while at the same time a greater amount of water is present in the liquid phase. The cyclic alkane carboxylic acid may be dissolved in water or in inert solvents such as hydrocarbons.

The starting materials are cyclic aliphatic carboxylic acids having the general formula

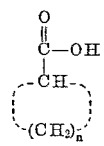

in which $n$ is a whole number, generally 3 to 12. Examples of such acids are cyclopentane carboxylic acid and cyclohexane carboxylic acid.

The preferred metallic compounds are copper compounds, both cuprous and cupric, which at least partly dissolve in the reaction liquid. Examples are copper oxide and copper salts. Advantageously, the copper salt may be the salt of the carboxylic acid being reacted, since, in this case, no foreign anions are introduced into the reaction liquid. It is also possible to employ copper metal, which reacts with the carboxylic acid in the presence of oxygen to form a salt.

Other metal compounds or metals may be used either alone or with copper and these include compounds of alkali metals, e.g., sodium and potassium, alkaline earth metals, e.g., barium and other metals, e.g., manganese, such as the sodium and potassium salts of cyclic aliphatic carboxylic acid, manganese oxide or barium oxide and compounds of heavy metals such as manganic oxides. The oxides may react with the carboxylic acid to form a salt. Other metals include silver and cobalt. Mixtures of these metals may also be employed, and in addition to the oxides and the salts of the reacting carboxylic acid, the salts of other carboxylic acids, such as acetates, and inorganic salts such as chlorides and sulfates may be used.

The products of the reaction include cyclic aliphatic ketones, cyclic olefins and unsaturated cyclic aliphatic carboxylic acids, as well as valuable by-products such as hydrocarbons, benzoic acid and phenol. These products may be separated by conventional procedures, such as by distillation.

The invention may be better understood from the following examples, which are for purpose of illustration only and in no way limit the invention.

Example 1

In a vertical cylindrical reaction vessel having a capacity of 0.5 litre and provided with a distillation column, a mixture of air and water vapor (volume ratio 1:1) is led through 41 gr. of molten cyclohexane carboxylic acid with the aid of a distributing device at the rate of 5 litres per hour and at a temperature of 210° C.; the cyclohexane carboxylic acid contained 0.5 gr. of cuprous oxide and 0.5 gr. of magnesium oxide in solution. The temperature of the distillation column is kept at 160–170° C., so that the cyclohexanone formed is discharged together with the low-boiling reaction products, whereas non-converted cyclohexane carboxylic acid and high-boiling products flow back into the reaction vessel.

After a reaction time of 10 hours, 34.5 gr. of cyclohexane carboxylic acid has been converted into 65% of cyclohexanone, 4% of phenol, 4% of benzoic acid, 12% of cyclic hydrocarbons and 15% of non-defined by-products.

Example 2

In a vertical cylindrical reaction vessel provided with a distilling column and a glass filter, which is fitted in the bottom of the vessel and with the aid of which gases can be passed through the reaction liquid in a highly dispersed state, 50 g. of cyclohexane carboxylic acid, 3.3 g. of cupric salt, and 10.3 g. of the magnesium salt of cyclohexane carboxylic acid are brought together. At a temperature of 215° C. a mixture of preheated air and water vapor (volume ratio 1:1.3) are passed through the solution at the rate of 24 litres per hour. The temperature in the distilling column is kept at 160–170° C., so that the low-boiling reaction products formed are discharged, while non-converted cyclohexane carboxylic acid and high-boiling reaction products flow back into the reaction vessel. By adding cyclohexane carboxylic acid during the reaction, the amount of the acid in the reaction vessel is kept at about 60 g.

After a reaction time of 48 hours it appears that 83 g. of cyclohexane carboxylic acid has been converted into 28.5 g. of cyclohexanone (45%), 17 g. of cyclohexene (32%), 5 g. of phenol (8%), and 11 g. of non-defined by-products.

Example 3

In a reaction vessel as described in Example 2, 50 g. of cyclohexane carboxylic acid, 3.3 g. of cupric salt, and 10.3 g. of the magnesium salt of cyclohexane carboxylic acid are brought together. At a temperature of 195° C. a mixture of preheated oxygen and water vapor (volume ratio 1:1.2) is subsequently passed through the solution at the rate of 12 litres per hour. The temperature of the distilling column is kept at 160–170° C. By adding cyclohexane carboxylic acid during the reaction, the amount of the acid in the reactor is kept at about 60 g.

After a reaction time of 48 hours, 101 g. of cyclohexane carboxylic acid has been converted into 11 g. of cyclohexanone (14%), 27 g. of cyclohexene (42%), 2 g. of phenol (3%), and 35 g. of non-defined by-products.

Example 4

In a reaction vessel as described in Example 2, 50 g. of cyclohexane carboxylic acid, 3.3 g. of cupric salt, 10.3 g. of the magnesium salt of cyclohexane carboxylic acid, and 0.9 of manganese dioxide are brought together. At a temperature of 205° C. a mixture of preheated air and water vapor (volume ratio 1:1.2) is subsequently passed through the solution at the rate of 10 litres per hour. In the meantime the temperature of the distilling column is kept at 160–180° C. By adding cyclohexane carboxylic acid during the reaction, the amount of the acid in the reactor is kept at about 60 g.

After a reaction time of 40 hours, 60 g. of cyclohexane carboxylic acid has been converted into 20 g. of cyclohexanone (43.5%), 11.5 g. of cyclohexene (30%), 1 g. of phenol (2%), and 11 g. of non-defined by-products.

Example 5

In a reaction vessel as described in Example 2, 50 g. of cyclohexane carboxylic acid, 3.3 g. of cupric salt, 10.3 g. of magnesium salt, and 5 g. of zinc carbonate are brought together. The reaction is carried out as described in Example 2. After 40 hours, 76 g. of cyclohexane carboxylic acid has been converted into 22.5 g. of cyclohexanone (39%), 1 g. of phenol (2%), 14 g. of cyclohexene (29%), and 9.6 g. of non-defined by-products.

Example 6

The apparatus used was the same as in Example 1 and the starting materials were 50 g. cyclohexane carboxylic acid, 3.3 g. cupric salt of said acid and 10.3 g. magnesium salt of said acid. Dry air was passed through the molten mixture at 230° C. with a speed of 10 litres per hour. The temperature in the column is 180–190° C. The amount of the acid in the vessel is maintained at about 60 g. by continuous addition of acid.

After 48 hours 109.5 g. of initial acid was converted into 18.0 g. cyclohexanone (21%), 14.2 g. of cyclohexene (20%), 4.7 g. of phenol (6%), 4.7 g. low-boiling products (4%) and 55.0 g. of a residue in the vessel (46%) consisting of non-identified high-boiling products.

Example 7

The apparatus used was the same as in Example 1, and the starting materials were 50 g. cyclohexane carboxylic acid, 4 g. silver salt of said acid, 10 g. magnesium salt of said acid. A mixture of air and steam (ratio 1:1.5 by volume) at a temperature of 205° C., and a speed of 16 litres per hour was passed through the molten mixture. The temperature in the column was 180–190° C. The amount of the acid in the vessel was maintained at about 120 g. by addition of more acid during the reaction.

After 35 hours 38 g. cyclohexane carboxylic acid was converted into 7.7 g. of cyclohexanone (29%), 0.5 g. of phenol (1%), 3.0 g. of cyclohexene (12%) and 15 g. of a high-boiling residue (39%).

Example 8

The apparatus used was the same as in Example 1, and the materials reacted were 50 g. cyclohexane carboxylic acid, 12 g. cobalt salt of said acid and 10 g. magnesium salt of said acid. A mixture of air and steam (volume ratio 1:1.1) was passed through a melt of these materials at a speed of 27 litres per hour and a temperature of 200° C. The temperature in the column was 170–180° C. The amount of the acid in the vessel was maintained at about 120 g. by addition of acid during the reaction.

After 48 hours, 35 g. cyclohexane carboxylic acid was converted into 7.7 g. of cyclohexanone (29%), 0.5 g of cyclohexene (2%), 0.5 g. of phenol (2%) and 13.5 g. of a high-boiling residue (39%).

Example 9

The apparatus used was the same as in Example 1 and the materials reacted were 51 g. cyclopentane carboxylic acid, 0.7 g. cupric-oxide (CuO), 0.7 g. magnesium oxide (MgO), 0.7 g. manganese dioxide ($MnO_2$). A mixture of air and steam (volume ratio 1:2) was passed through a melt of these materials at a speed of 20 litres per hour and a temperature in the vessel of 195° C. The temperature in the column was 130° C.

After 24 hours there was obtained 2 g. of cyclopentanone (10%), and 2 g. of cyclopentene (12%) as distillation products.

The contents of the vessel are further distilled yielding 24 g. unconverted initial acid, 18 g. cyclopentene carboxylic acid (68%) and 5 g. high-boiling residue (10%).

What is claimed is:

1. A process for the conversion of cycloalkane carboxylic acid having the formula

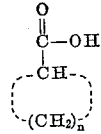

in which $n$ is a whole number of 3 to 12, which comprises fusing said acid and reacting the fused acid with molecular oxygen in the presence of water vapor and in the presence of a copper compound dissolved in said fused acid, selected from the group consisting of copper oxide and copper salts, at a temperature not less than 150° C. to form a reaction product.

2. A process as set forth in claim 1 in which said acid is cyclopentane carboxylic acid, said process including recovering cyclopentene carboxylic acid from the reaction products.

3. A process as set forth in claim 1 in which said acid is cyclohexane carboxylic acid, said process including recovering cyclohexene from the reaction products.

4. A process as set forth in claim 1 in which said compound is the copper salt of said acid.

References Cited by the Examiner

UNITED STATES PATENTS 2,697,729  12/1954  Ohlson et al. _____ 260—586
3,125,600  3/1964  Fuchs _____ 260—586 X

OTHER REFERENCES

Migrdichian, Organic Synthesis, vol. 1, page 297 (1957).
Schoo et al., "Rec. Trav. Chim. Pays-Bas," vol. 80, pages 134–138, February 1961.
Toland, "J. Am. Chem. Soc.," vol. 83, pp. 2507–2512 (1961).
Ueno et al., "Chem. Abstracts," vol. 42, page 6329c (1948).

LORRAINE A. WEINBERGER, *Primary Examiner.*

CHARLES B. PARKER, LEON ZITVER, *Examiners.*